United States Patent
Abe (10) Patent No.: US 9,126,111 B2
(45) Date of Patent: Sep. 8, 2015

(54) PORTABLE ELECTRONIC DEVICE

(75) Inventor: Akira Abe, Chiba (JP)

(73) Assignees: SONY CORPORATION, Tokyo (JP); SONY COMPUTER ENTERNTAINMENT INC., Tokyo (JP)

(*) Notice: Subject to any disclaimer, the term of this patent is extended or adjusted under 35 U.S.C. 154(b) by 85 days.

(21) Appl. No.: 13/535,487

(22) Filed: Jun. 28, 2012

(65) Prior Publication Data

US 2013/0003286 A1    Jan. 3, 2013

(30) Foreign Application Priority Data

Jun. 29, 2011 (JP) ................................. 2011-144945

(51) Int. Cl.
| | |
|---|---|
| G11B 33/02 | (2006.01) |
| G06F 1/16 | (2006.01) |
| A63F 13/90 | (2014.01) |
| A63F 13/00 | (2014.01) |

(52) U.S. Cl.
CPC .............. *A63F 13/08* (2013.01); *G06F 1/1626* (2013.01); *G06F 1/1656* (2013.01); *G06F 1/1679* (2013.01); *G06F 1/1681* (2013.01); *G11B 33/027* (2013.01); *A63F 2300/204* (2013.01); *E05Y 2900/606* (2013.01)

(58) Field of Classification Search
CPC .............. H05K 5/00; H05K 7/00; G06F 1/16
USPC ............................ 361/679.02, 679.57, 679.58
See application file for complete search history.

(56) References Cited

U.S. PATENT DOCUMENTS

| | | | | |
|---|---|---|---|---|
| 5,408,459 | A * | 4/1995 | Kawaguchi et al. | 720/647 |
| 7,121,637 | B2 * | 10/2006 | Fang | 312/223.2 |
| 7,835,150 | B2 * | 11/2010 | Degner et al. | 361/679.58 |
| 7,920,373 | B2 * | 4/2011 | Matsubara | 361/679.01 |
| 2004/0172641 | A1 * | 9/2004 | Saito | 720/646 |

(Continued)

FOREIGN PATENT DOCUMENTS

| | | |
|---|---|---|
| CN | 101303870 | 11/2008 |
| EP | 0 194 138 | 9/1986 |

(Continued)

OTHER PUBLICATIONS

Japanese Office Action dated Apr. 23, 2013, from corresponding Japanese Application No. 2011-144945.

(Continued)

*Primary Examiner* — Zachary M Pape
*Assistant Examiner* — Douglas Burtner
(74) *Attorney, Agent, or Firm* — Katten Muchin Rosenman LLP (57) ABSTRACT

A holding portion 12 has a shape which allows relative movement between a pivot portion 21 and the holding portion 12 in the radial direction of the pivot portion 21 such that cover 20 is attachable to, and removable from, a cabinet 11 in the radial direction of the pivot portion 21. An engaging member 50 is movable between a locked position and a unlocked position. At the locked position, the engaging member 50 engages with the cabinet 11 so as to restrict the relative movement between the pivot portion 21 and the holding portion 12. At the unlocked position, the engaging member 50 releases the engagement between the engaging member 50 and the cabinet 11. A stopper 13 restricts the movement of the engaging member 50 from the locked position to the unlocked position.

8 Claims, 11 Drawing Sheets

(56) References Cited

U.S. PATENT DOCUMENTS

| | | |
|---|---|---|
| 2006/0143632 A1 | 6/2006 | Matsuda et al. |
| 2007/0150908 A1* | 6/2007 | Ogasawara et al. ........... 720/600 |
| 2007/0202956 A1 | 8/2007 | Ogasawara et al. |
| 2009/0122681 A1* | 5/2009 | Ishihara et al. ............ 369/75.11 |
| 2011/0310582 A1* | 12/2011 | Takamatsu .................... 361/807 |

FOREIGN PATENT DOCUMENTS

| | | |
|---|---|---|
| JP | 4-239452 | 8/1992 |
| JP | 8-46369 | 2/1996 |
| JP | 2002-170357 | 6/2002 |
| JP | 2002-197848 | 7/2002 |
| JP | 2004-158140 | 6/2004 |
| JP | 2005-267830 | 9/2005 |

OTHER PUBLICATIONS

European Search Report dated Dec. 9, 2014 from corresponding Application No. 12173673.0.

Chinese First Office Action dated Oct. 10, 2014 from corresponding Application No. 201210225225.8.

* cited by examiner

PORTABLE ELECTRONIC DEVICE

CROSS-REFERENCE TO RELATED APPLICATION

The present application claims priority from Japanese application JP 2011-144945 filed on Jun. 29, 2011, the content of which is hereby incorporated by reference into this application.

BACKGROUND OF THE INVENTION

1. Field of the Invention

The present invention relates to a portable electronic device having a cover configured to cover a receiving space for a portable recording medium.

2. Description of the Related Art

Conventionally, portable electronic devices having a receiving space for a portable recording medium have been utilized. An electronic device disclosed in United States Patent Application Publication No. 2007/0202956 includes an openable and closable cover on a back side thereof, and the receiving space formed in the device main body is covered by the cover.

In some cases, electronic devices as described above have a pivot portion formed on one of the cover and the device main body to support the cover allowing its opening and closing and a cylindrical holding portion formed on the other one of those to hold the pivot portion. However, such a structure requires, in a manufacturing process of the electronic device, an operation to fit the pivot portion into the holding portion while bending a member formed with the pivot portion slightly, which lessens workability.

SUMMARY OF THE INVENTION

A portable electronic device according to an aspect of the present invention including: an device main body; a receiving space formed in the device main body, for storing a recording medium therein; a cover openable and closable with respect to the device main body, for covering the receiving space; a pivot portion provided on the device main body or the cover and supporting the cover so that the cover is openable and closable; and a holding portion for holding the pivot portion, which is provided on a contrary member to a member which is the cover or the device main body and provided with the pivot portion. The holding portion has a shape which allows a relative movement between the pivot portion and the holding portion in a radial direction of the pivot portion such that the cover is attachable to, and removable from, the device main body in the radial direction. The electronic device includes an engaging member attached to one of the device main body and the cover and is capable of moving around the pivot portion. The engaging member is movable between a locked position and a unlocked position. At the locked position, the engaging member engages with the other one of the device main body and the cover to restrict the relative movement between the pivot portion and the holding portion. At the unlocked position, the engaging member releases the engagement between the engaging member and the other one of the device main body and the cover. The electronic device includes a stopper for restricting the movement of the engaging member from the locked position to the unlocked position.

According to the above device, since the cover can be attached to and removed from the device main body in the radial direction of the pivot portion in a state in which the engaging member is arranged at the unlocked position, the workability of the operation of attaching the cover on the device main body can be improved. Also, after having attached the cover on the device main body, the cover can be prevented from separating from the device main body by moving the engaging member to the locked position.

DETAILED DESCRIPTION OF THE INVENTION

Figure 1:
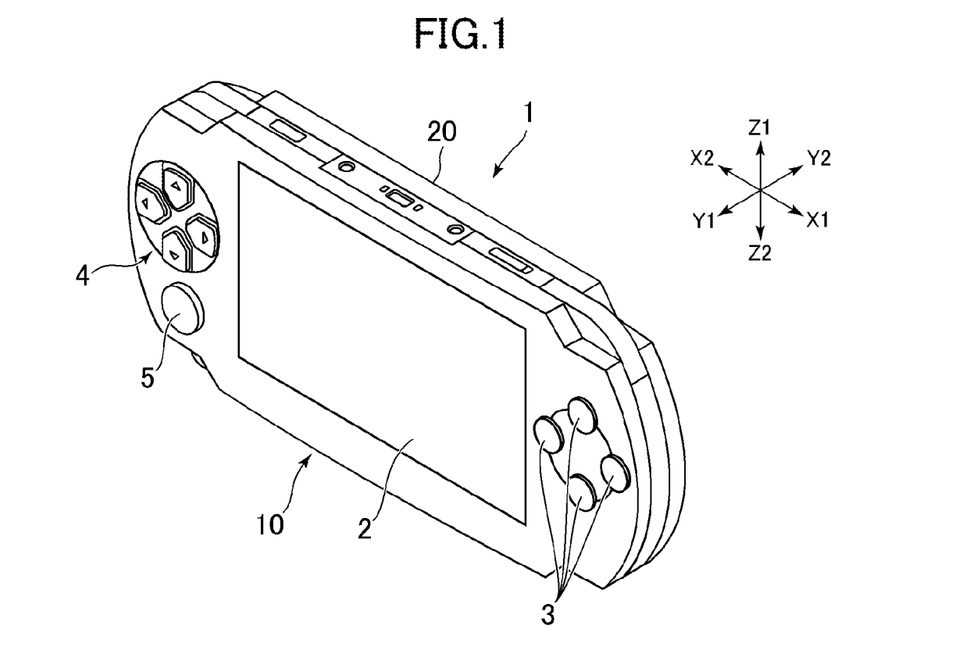
FIG. 1 is a perspective view of a portable electronic device according to an embodiment of the invention when viewing the front thereof obliquely.
Figure 2:
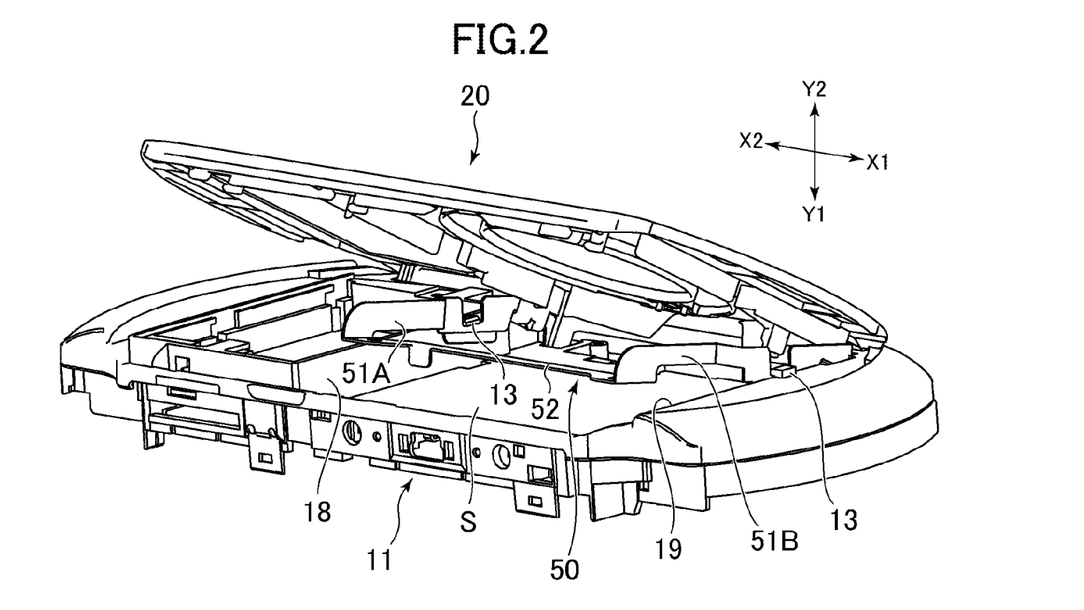
FIG. 2 is a perspective view showing a state in which a cover provided on a back side of the electronic device is opened.
Figure 3:
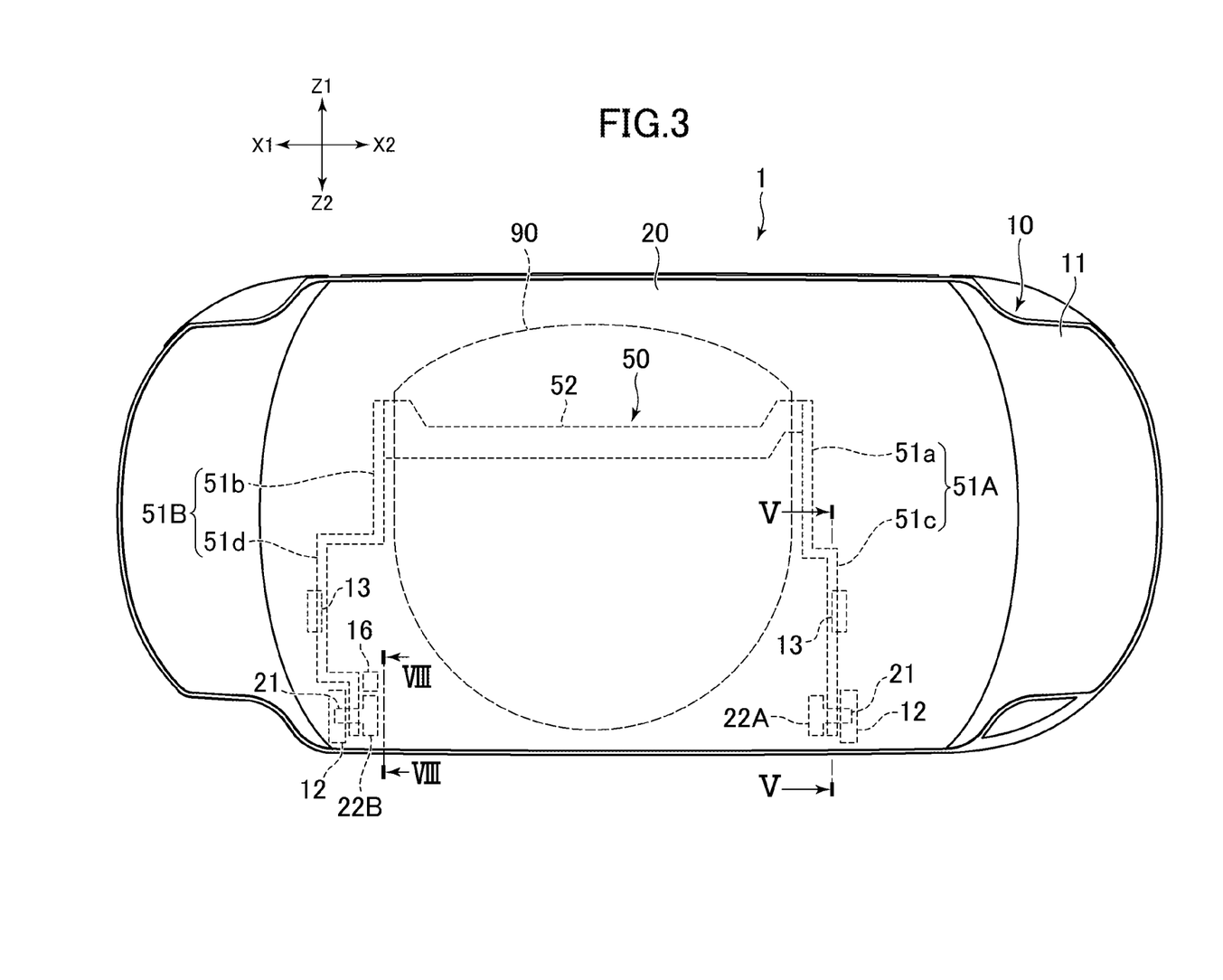
FIG. 3 is a back view of the electronic device.
Figure 4:
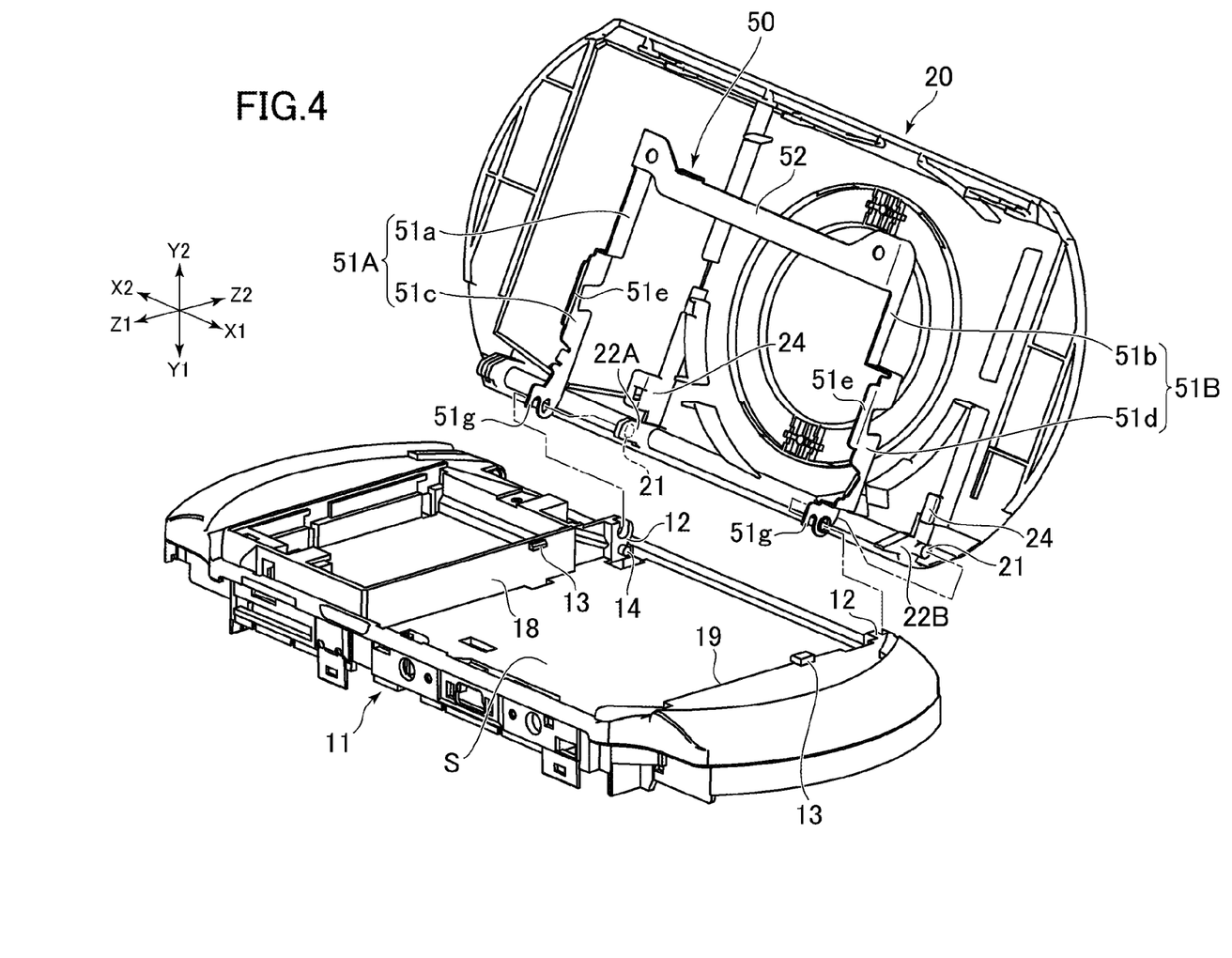
FIG. 4 is a perspective view showing a state in which the cover is removed from an device main body.
Figure 5:
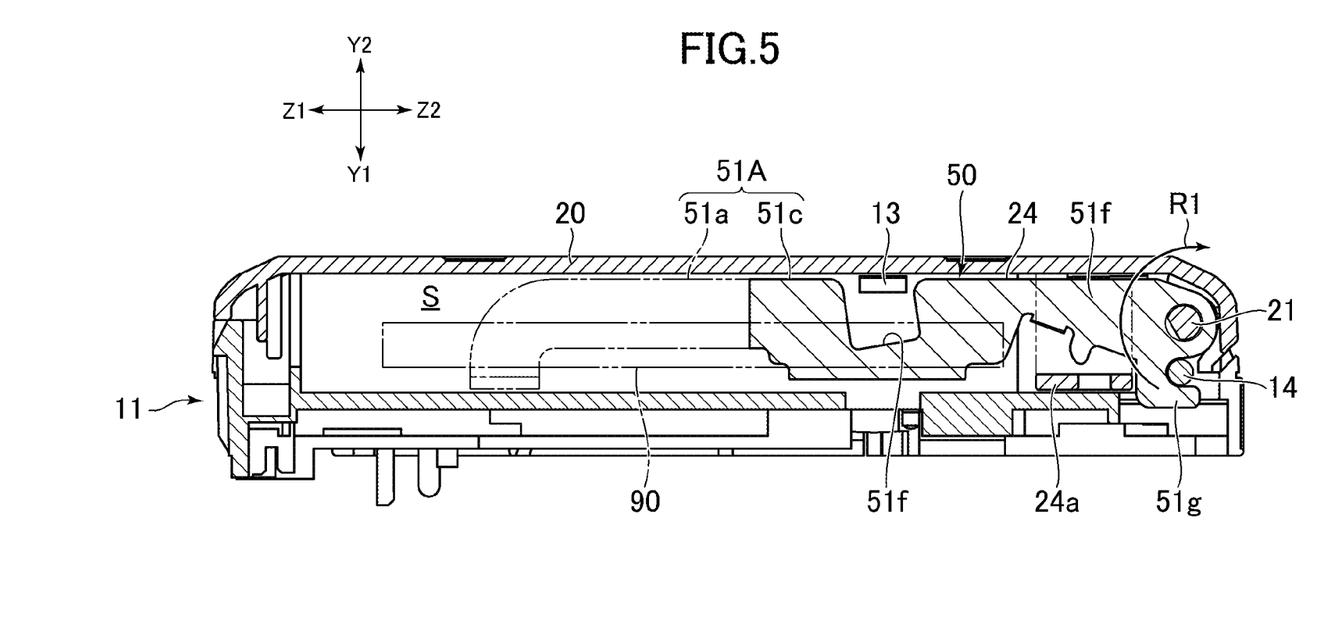
FIG. 5 is a cross-sectional view for explaining a movement of the cover and an engaging member and showing the cover arranged at a closing position and the engaging member arranged at a locked position.
Figure 6:
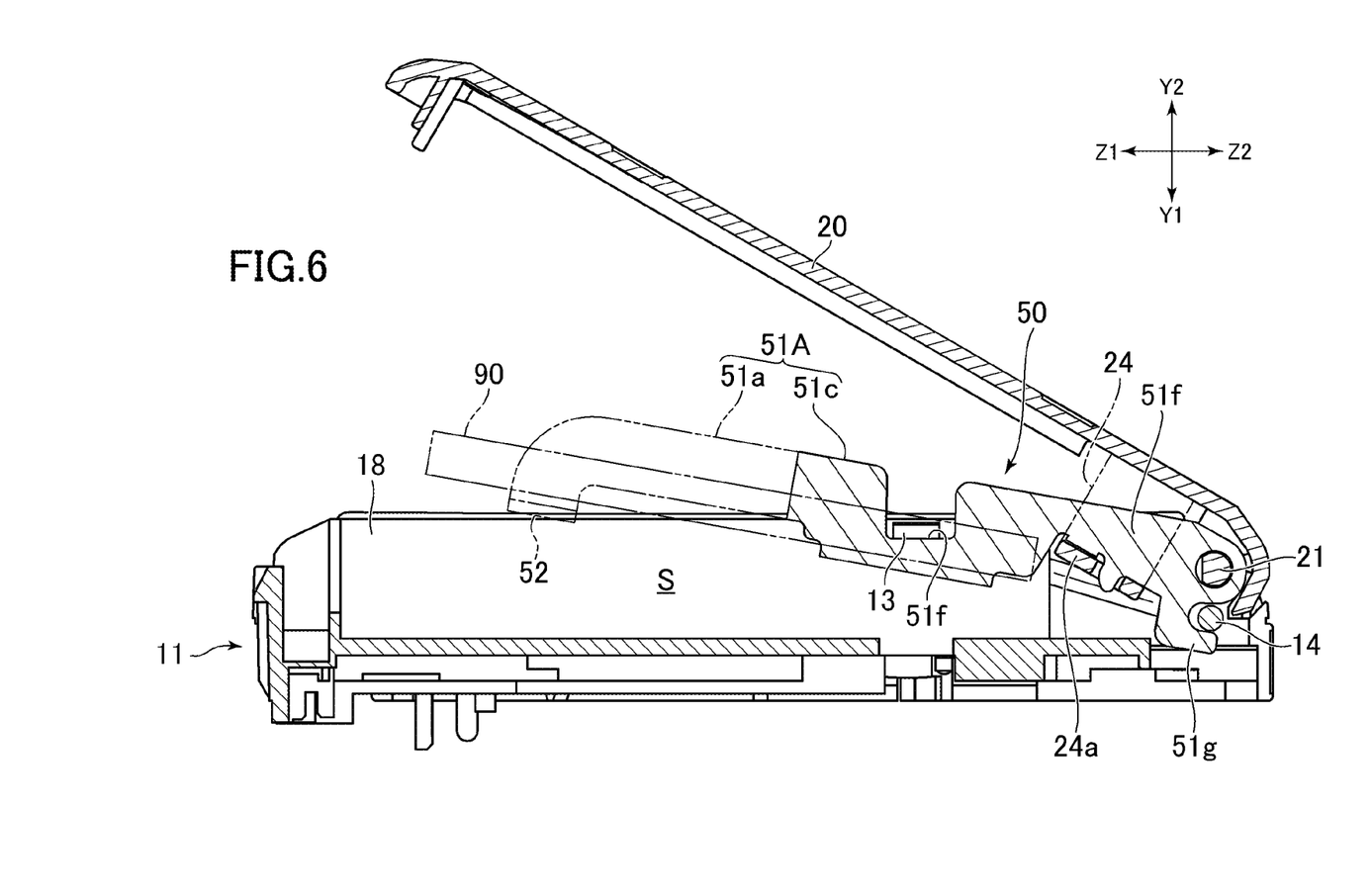
FIG. 6 is a cross-sectional view for explaining the movement of the cover and the engaging member and showing the cover arranged at an opening position and the engaging member arranged at an intermediate inclined position.
Figure 7:
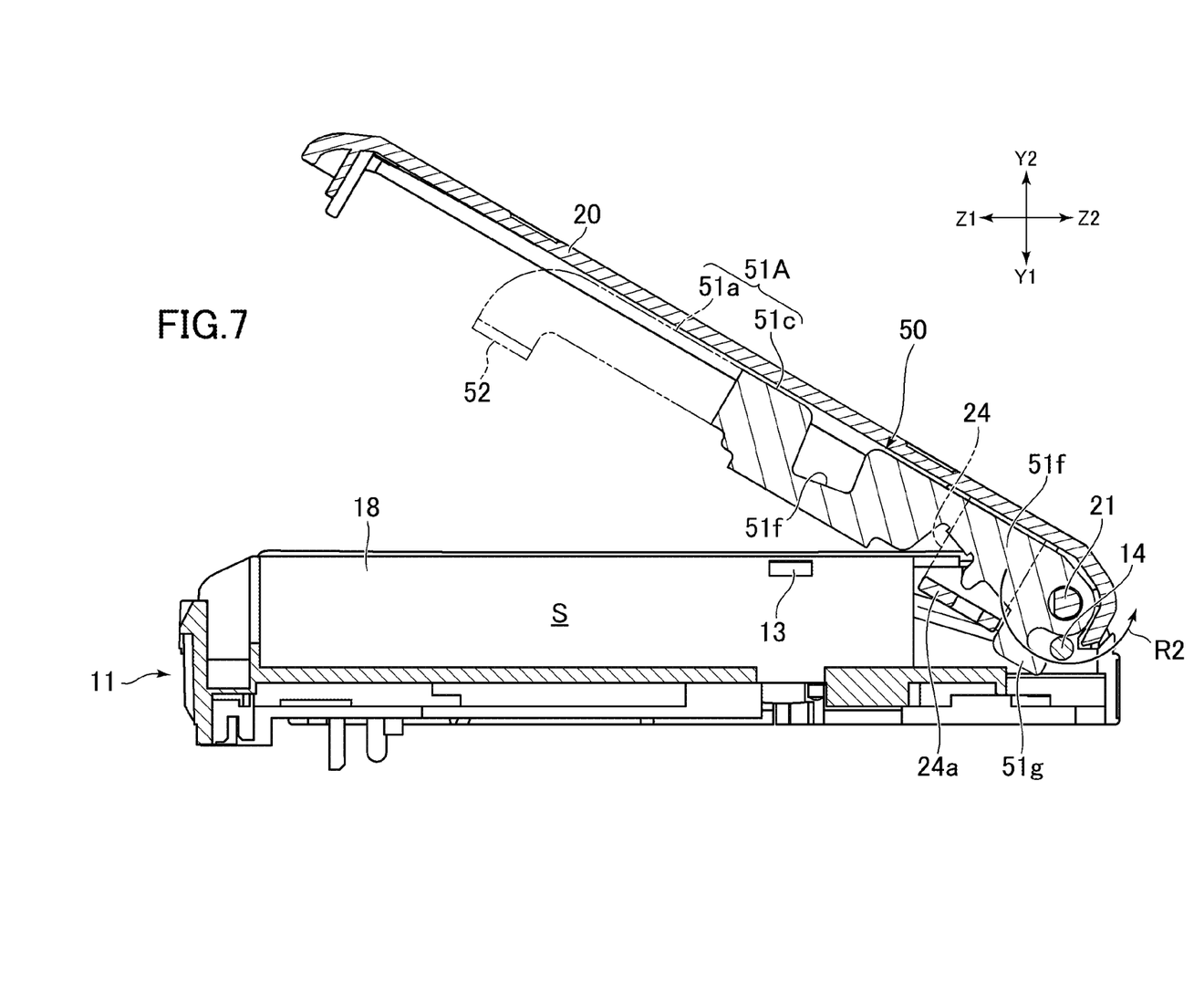
FIG. 7 is a cross-sectional view for explaining the movement of the cover and the engaging member and showing the cover arranged at the opening position and the engaging member arranged at an unlocked position.

Referring to the drawings, an embodiment of the invention will be described. FIG. 1 is a perspective view of a portable electronic device 1 according to an embodiment of the invention when viewing the front thereof obliquely. FIG. 2 is a perspective view showing a state in which a cover 20, described later, provided on a back side of the electronic device 1 is opened. FIG. 3 is a back view of the electronic device 1. FIG. 4 is a perspective view showing a state in which the cover 20 is removed from an device main body 10. FIG. 5 to FIG. 7 are cross-sectional view for explaining movements of the cover 20 and an engaging member 50, described later. The cross sections of these drawings are taken along a line V-V in FIG. 3. FIG. 5 shows the cover 20 arranged at a closing position and the engaging member 50 arranged at a locked position. FIG. 6 shows the cover 20 arranged at an opening position and the engaging member 50 arranged at an intermediate inclined position described later. FIG. 7 shows the cover 20 arranged at the opening position and the engaging member 50 arranged at an unlocked position.

In the following description, X1 and X2 shown in FIG. 1 are the rightward direction and the leftward direction, respectively. The directions indicated by Y1 and Y2 are forward and backward respectively, and the directions indicated by Z1 and Z2 are upward and downward, respectively. In the following description, the direction of rotation of the cover 20 moving from the closing position to the opening position is referred to as "opening direction" (R1 in FIG. 5). The direction of rotation of the cover 20 moving from the opening position to the closing position is referred to as "closing direction" (R2 in FIG. 7).

As shown in FIG. 1, the electronic device 1 has a display screen 2 on a front surface thereof. The electronic device 1 in this example is capable of functioning as a game device, a moving image regenerating device, and a communication device, and thus includes, on the right side and the left side of the display screen 2, plural operating members which allow users to operate. More specifically, plural buttons 3 are arranged on the right side of the display screen 2. A cross-key 4 and an operating stick 5 are arranged on the left side of the display screen 2.

As shown in FIG. 3, the electronic device 1 includes the device main body 10, and the cover 20 openable and closable with respect to the device main body 10. In this example, the cover 20 is arranged on the back side of the device main body 10. The device main body 10 includes a cabinet 11. Various components such as a circuit board (not shown) and a display device (not shown) which constitutes the display screen 2 are mounted on the cabinet 11 as shown in FIG. 2. The cabinet 11 has a receiving space S formed therein for storing a portable recording medium 90 in which a game program or moving image data or the like are stored (see FIG. 3 and FIG. 5). The receiving space S is formed on the back side of the cabinet 11 and is covered with the cover 20. A reading device for the recording medium 90 is also mounted on the cabinet 11.

The electronic device 1 includes pivot portions 21 and holding portions 12 to support the pivot portions 21 so as to be rotatable with respect to each other, as shown in FIG. 4. The pivot portions 21 support the cover 20 so as to enable the cover 20 to open and close. Thus the cover 20 is capable of moving around the pivot portions 21. More specifically, the cover 20 is movable between the opening position (the position of the cover 20 shown in FIG. 5) and the closing position (the position of the cover 20 shown in FIG. 6 and FIG. 7). In this example, the pivot portions 21 are formed on the cover 20, and the holding portions 12 are formed on the cabinet 11. Therefore, the pivot portions 21 rotate with respect to the holding portions 12 in association with the opening and closing of the cover 20.

The cover 20 in this example includes attaching portions 22A and 22B at a lower edge thereof. The attaching portions 22A and 22B project toward the cabinet 11 in a state in which the cover 20 is arranged in the closing position. The pivot portions 21 project from side surfaces of the attaching portions 22A and 22B leftward and rightward. The cover 20 in this example includes the two attaching portions 22A and 22B away from each other in the lateral direction, and the pivot portions 21 are formed on the attaching portions 22A and 22B, respectively.

Figure 8A:
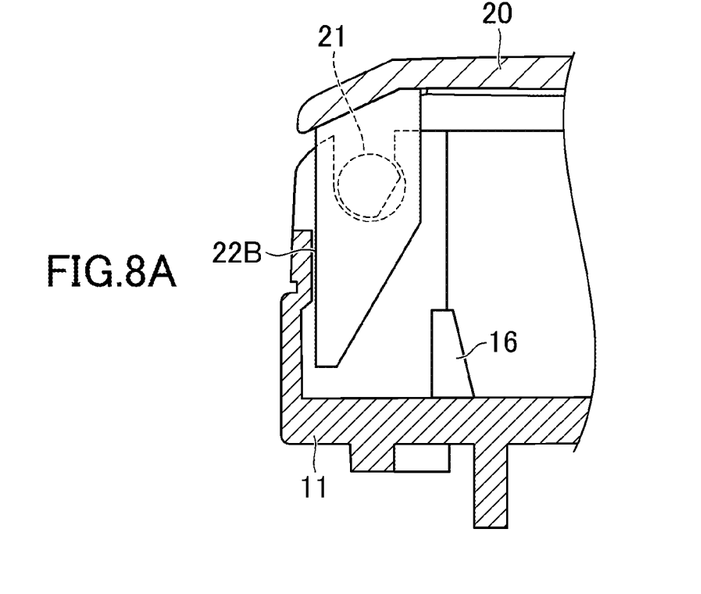
FIG. 8A is a schematic cross-sectional view taken along a line VIII-VIII in FIG. 3 and showing a positional relationship between a attaching portion and a stopper when the cover is arranged at the closing position.
Figure 8B:
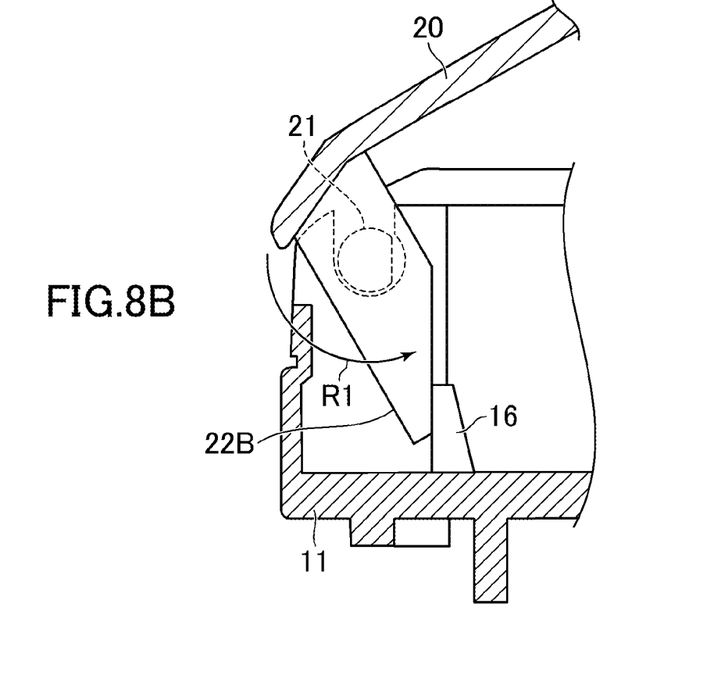
FIG. 8B is the schematic cross-sectional view taken along the line VIII-VIII in FIG. 3 and showing the positional relationship between the attaching portion and the stopper when the cover is arranged at the opening position.

The cabinet 11 includes a stopper 16 to restrict the movement of the cover 20 beyond the opening position (see FIG. 3). FIGS. 8A and 8B are schematic cross-sectional views taken along a line VIII-VIII in FIG. 3. FIG. 8A shows a positional relationship between the attaching portion 22B and the stopper 16 when the cover 20 is arranged at the closing position, and FIG. 8B shows a positional relationship between the attaching portion 22B and the stopper 16 when the cover 20 is arranged at the opening position. As shown in these drawings, the stopper 16 projects from a bottom portion of the cabinet 11. When the cover 20 is arranged at the opening position, the attaching portion 22B comes into contact against the stopper 16 in an opening direction R1. Accordingly, the movement of the cover 20 beyond the opening position is restricted.

Figure 9:
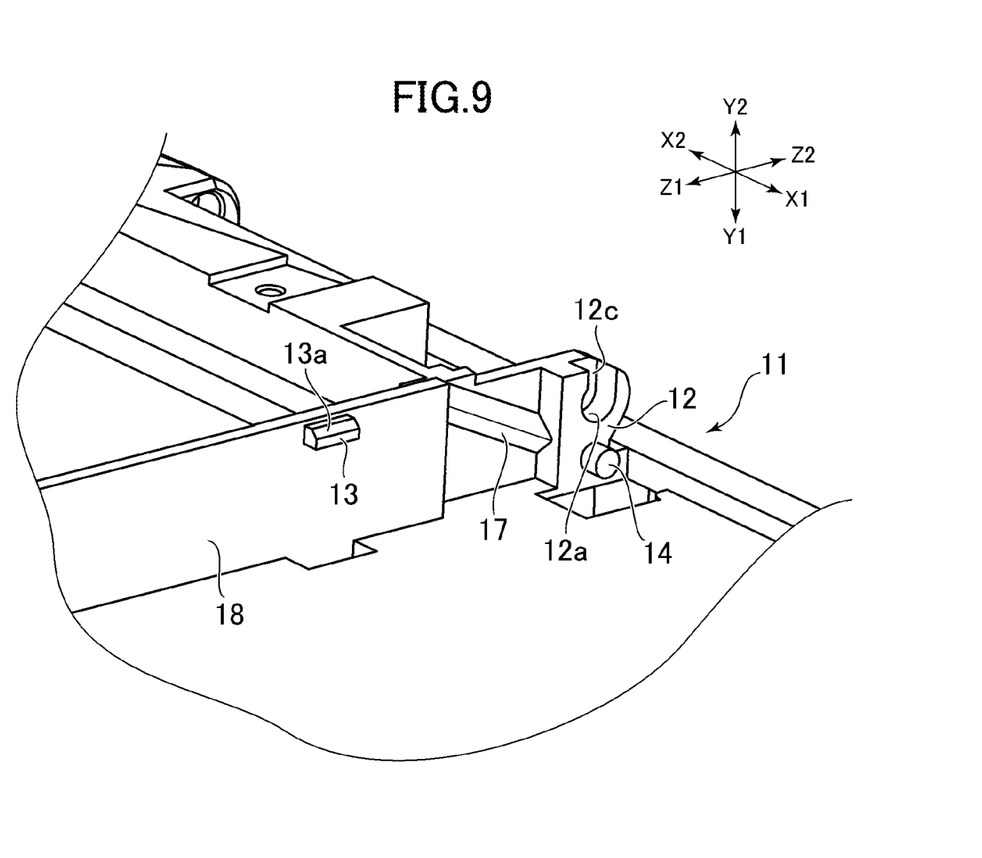
FIG. 9 is an enlarged perspective view of a portion provided with a holding portion in a cabinet.
Figure 10A:
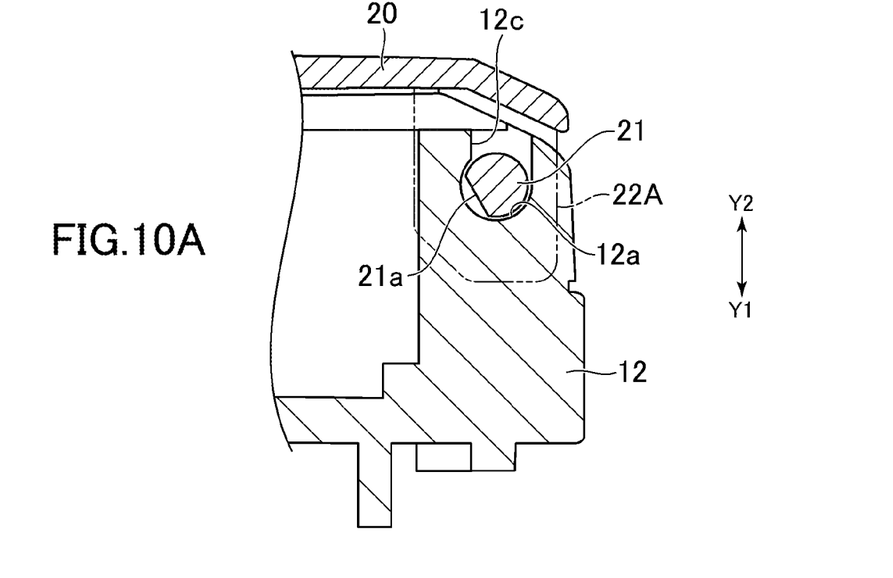
FIG. 10A is a drawing for explaining a movement of pivot portions and the cover with respect to the holding portions and showing the cover arranged at the closing position.
Figure 10B:
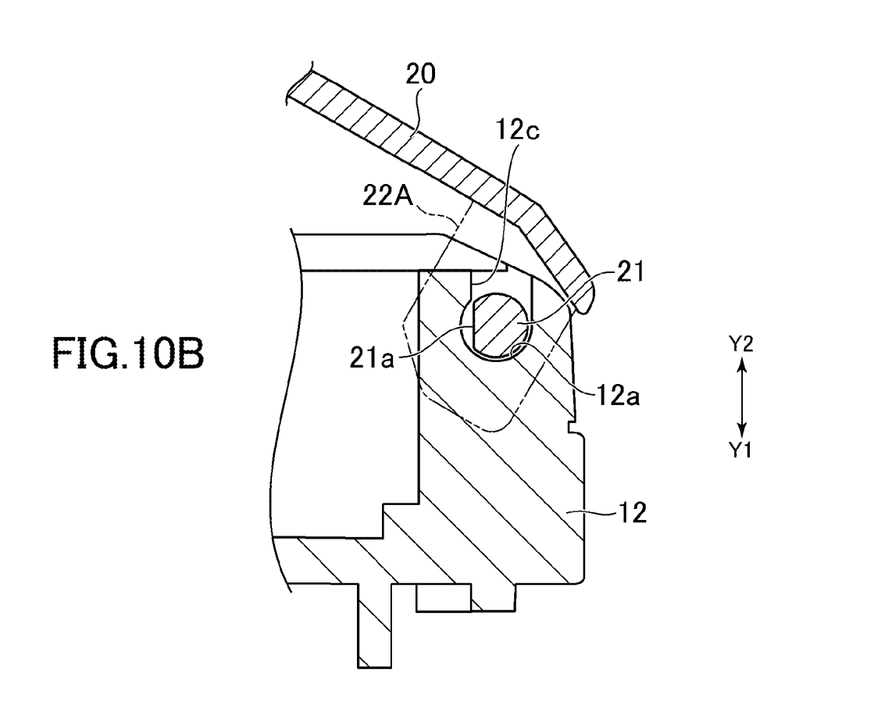
FIG. 10B is a drawing for explaining the movement of the pivot portions and the cover with respect to the holding portions and showing the cover arranged at the opening position.

The holding portions 12 have a shape allowing the relative movement between the pivot portions 21 and the holding portions 12 in the radial direction of the pivot portions 21. Therefore, the cover 20 is attachable to, and removable from, the cabinet 11 in the radial direction of the pivot portions 21. FIG. 9 is an enlarged perspective view of a portion provided with the holding portion 12 in the cabinet 11. FIGS. 10A and 10B are drawings for explaining the movement of the pivot portion 21 and the cover 20 with respect to the holding portion 12. FIG. 10A shows the cover 20 arranged at the closing position, and FIG. 10B shows the cover 20 arranged at the opening position. As shown in FIG. 9 and FIG. 10, the holding portion 12 in this example has a depression 12a formed therein which opens in the radial direction of the pivot portion 21 (opens rearward indicated by Y2 in this example). In this example, the depression 12a is opened toward the rear side of the cabinet 11. The pivot portion 21 is fitted into the depression 12a, and is rotatable inside the depression 12a. Since the depression 12a is opened rearward, the pivot portion 21 can be moved rearward with respect to the holding portion 12. In other words, in a manufacturing process of the electronic device 1, the pivot portion 21 can be fitted to the holding portion 12 from the rear side of the cabinet 11 without deflecting the cover 20, and the pivot portion 21 can be removed from the holding portion 12 toward the rear side of the cabinet 11. As described above, the cover 20 includes two pivot portions 21, and the cabinet 11 includes two holding portions 12 separated from each other in the lateral direction (see FIG. 3).

As shown in FIG. 9 and FIG. 10, the bottom of the depression 12a in this example has an annular inner surface. The opening of the depression 12a (an entry port for the pivot portion 21) is a groove having a width smaller than the inner diameter of the bottom, and has a flat inner surface 12c. In contrast, the pivot portion 21 has a shape obtained by partly cutting the outer peripheral surface of a column, and has a flat surface 21a partly on the outer peripheral surface thereof. As shown in FIG. 10A, when the cover 20 is arranged at a position closer to the closing position than to the opening position, the inner surface 12c of the depression 12a and the flat surface 21a of the pivot portion 21 are dislocated from each other, and thus the pivot portion 21 is inhibited from coming off from the depression 12a. As shown in FIG. 10B, when the cover 20 is arranged at the opening position, the position of the side surface 12c formed on the opening of the depression 12a and the position of the flat surface 21a of the pivot portion 21 match. In other words, when an angle of the cover 20 with respect to the cabinet 11 matches an angle at the opening position, the pivot portion 21 can be moved in the radial direction with respect to the depression 12a, whereby the cover 20 can be attached to, and removed from, the cabinet 11.

As shown in FIG. 4, the electronic device 1 includes an engaging member 50. The engaging member 50 has a function to prevent separation between the cover 20 and the cabinet 11. The engaging member 50 in this example also facilitates the recording medium 90 to be taken in and out the receiving space S as described later in detail.

In this example, the engaging member 50 is attached to the cover 20. Specifically, the engaging member 50 is arranged inside the cover 20, and is attached to the pivot portions 21 of the cover 20. The engaging member 50 includes left and right arm portions 51A and 51B extending in the radial direction of the pivot portions 21 and a cross-bar portion 52 bridged between the arm portions 51A and 51B, as shown in FIG. 4 and FIG. 5. The two pivot portions 21 are fitted into holes formed on proximal portions of the arm portions 51A and 51B respectively. The engaging member 50 is formed, for example, from a sheet metal.

The engaging member 50 can be moved around the pivot portions 21. More specifically, the engaging member 50 can be moved between a locked position (the position of the engaging member 50 shown in FIG. 5) and an unlocked position (the position of the engaging member 50 shown in FIG. 7). At the locked position, the engaging member 50 engages with the cabinet 11. At the unlocked position, the engagement between the engagement member 50 and the cabinet is released. In this example, the intermediate inclined position (the position of the engaging member 50 shown in FIG. 6) is defined between the locked position and the unlocked position. At the intermediate inclined position, the engaging member 50 is in contact with stoppers 13 (see FIG. 2), described later, formed on the cabinet 11. The engaging member 50 keeps to engage with the cabinet 11 within a range from the locked position to the intermediate inclined position. The structure in which the engaging member 50 is engages with the cabinet 11 will be described in detail later.

The cover 20 and the engaging member 50 can be moved around the common pivot portions 21. The cover 20 and the engaging member 50 are configured so that the directions of movement thereof (the opening direction, the closing direction) match. That is, when the cover 20 moves in the closing direction, the engaging member 50 moved in the closing direction toward the locked position. When the cover 20 is arranged at the closing position, the engaging member 50 is arranged at the locked position (see FIG. 5). When the cover 20 moves in the opening direction, the engaging member 50 moves in the opening direction toward the unlocked position.

In this example, the cover 20 and the engaging member 50 may be moved relatively with each other around the pivot portions 21, and an angle of the engaging member 50 with respect to the cover 20 can be changed. That is, when the cover 20 and the engaging member 50 move from the closing position and the locked position in the opening direction respectively, the engaging member 50 comes into contact against the stoppers 13 descried later and stays at the intermediate inclined position without reaching the unlocked position as shown in FIG. 6. In contrast, the cover 20 is opened at a larger angle than the angle of the engaging member 50 at the intermediate inclined position (see FIG. 7). Consequently, the cover 20 moves to the opening position and comes into contact against the stopper 16 (see FIG. 8B). When the engaging member 50 is arranged at the unlocked position, for example, when the engaging member 50 is bent in the direction along an axis of the pivot portions 21 and climbs over the stoppers 13, the cover 20 arranged in the opening position and the engaging member 50 are allowed to move with respect to the cabinet 11 in the radial direction of the pivot portions 21 (direction Y1-Y2).

As described above, the proximal end portions of the arm portions 51A and 51B of the engaging member 50 are respectively attached to the pivot portions 21. As shown in FIG. 3, in a state in which the pivot portions 21 are held by the holding portions 12 of the cabinet 11, the proximal end portions of the arm portions 51A and 51B are clamped between the attaching portions 22A and 22B and the holding portions 12 of the cover 20. Accordingly, the state in which the engaging member 50 is attached to the pivot portions 21 can reliably be maintained. In this example, the pivot portions 21 project outward from the two attaching portions 22A and 22B in the lateral direction, and are fitted to the proximal end portions of the arm portions 51A and 51B. Then, the holding portions 12 are located further outward of the proximal end portions of the arm portions 51A and 51B.

The engaging member 50 keeps to engage with the cabinet 11 in a range from the locked position shown in FIG. 5 to the intermediate inclined position shown in FIG. 6 (hereinafter, referred to as "locked range"), and hence the relative movement between the pivot portions 21 and the holding portions 12 in the radial direction of the pivot portions 21 is restricted. Accordingly, in a state in which the engaging member 50 is located in the locked range, the cover 20 can be prevented from coming off from the cabinet 11. In contrast, in the unlocked position shown in FIG. 7, engagement between the engaging member 50 and the cabinet 11 is released.

The structure in which the engaging member 50 engages with the cabinet 11 will now be described. In this example, engaged projections 14 are formed on the holding portions 12 as shown in FIG. 9. The engaged projections 14 project from the holding portions 12 toward the arm portions 51A and 51B of the engaging member 50, that is, toward centers thereof in the lateral direction in the direction along the axis of the pivot portions 21. As described above, the pivot portions 21 are capable of coming off rearward from the depressions 12a of the holding portions 12 (here, the direction in which the pivot portions 21 are coming off is referred to as pivot disengagement direction (direction indicated by an arrow Y2). As shown in FIG. 5 and FIG. 6, the proximal end portions of the arm portions 51A and 51B have hook portions 51g formed therein, respectively. The hook portions 51g are located from the engaged projections 14 in the direction opposite from the pivot disengagement direction when the engaging member 50 is arranged in the locked range. Therefore, movement of the pivot portions 21 in the pivot disengagement direction, that is, the separation of the cover 20 from the cabinet 11 may be prevented.

As shown in FIG. 5 and FIG. 6, when the engaging member 50 is arranged in the locked range, the hook portions 51g are located from the engaged projections 14 in the rotational direction in which the engaging member 50 moves from the locked position to the unlocked position (that is, the opening direction). Therefore, when the engaging member 50 is arranged at the unlocked position as shown in FIG. 7, the hook portions 51g are located apart from the engaged projections 14 in the circumferential direction of the pivot portion 21. That is, the engaged projections 14 are located out of the hook portions 51g, and then the engagement between the hook portions 51g and the engaged projections 14 are released. According to the positional relationship between the hook portions 51g and the engaged projections 14 as described above, the hook portions 51g engages with the engaged projections 14 by the rotation of the engaging member 50 from the unlocked position toward the locked position. When the engaging member 50 is arranged at an angle of the unlocked position, the engaging member 50 is free to move relatively to the engaged projections 14 in the pivot disengagement direction and in the direction opposite from the pivot disengagement direction. As a consequence, by arranging the engaging member 50 at the angle of the unlocked position, the cover 20 can be removed from, and attached to, the cabinet 11.

Figure 11:
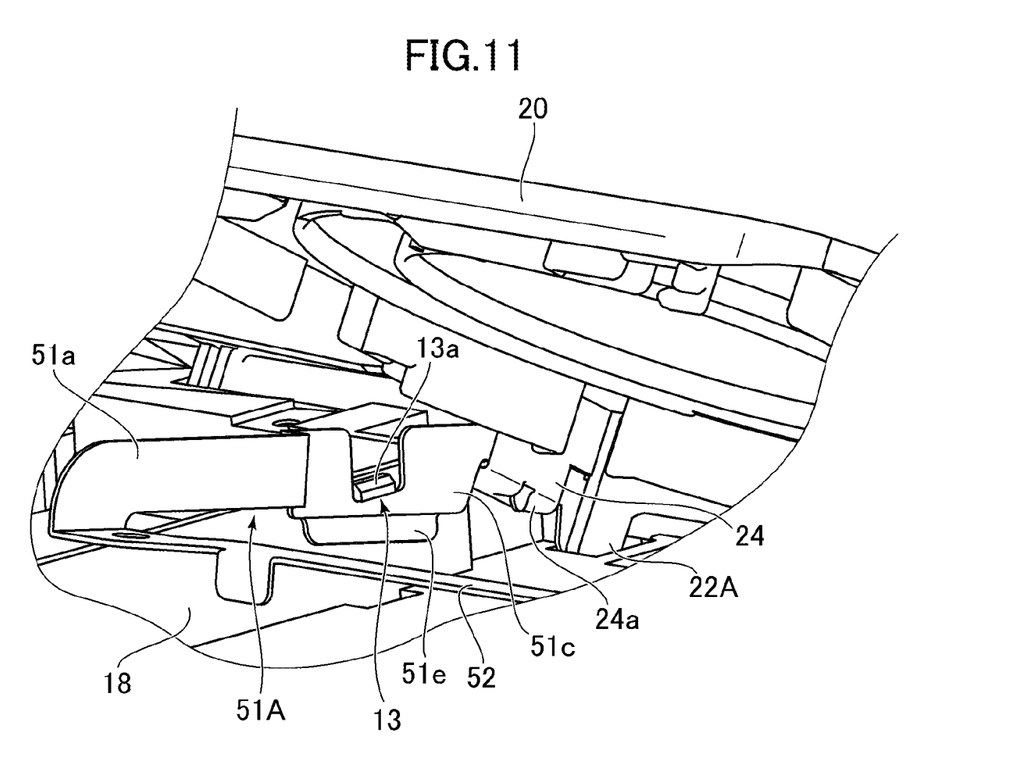
FIG. 11 is an enlarged view of FIG. 1 in which the cover arranged at the opening position and the engaging member arranged at the intermediate inclined position are shown.

FIG. 11 is an enlarged view of FIG. 1 in which the cover 20 is arranged at the opening position and the engaging member 50 is arranged at the intermediate inclined position. As shown in FIG. 11, the cabinet 11 has the stopper 13 formed thereon which limits the movement of the engaging member 50 from the locked position (the locked range) to the unlocked position. In this example, the stoppers 13 are formed on side walls 18 and 19 of the receiving space S for the recording medium 90, respectively (see FIG. 4). More specifically, the stoppers 13 project from upper edges of the side walls 18 and 19 toward the inside of the receiving space S and are located on trajectories of the arm portions 51A and 51B of the engaging member 50. Therefore, as shown in FIG. 6 and FIG. 10, the stoppers 13 come into contact against the arm portions 51A and 51B of the engaging member 50 moving from the locked position toward the unlocked position. Accordingly, the engaging member 50 is arranged at the intermediate inclined position, and the engaging member 50 is restricted by the stoppers 13 from moving in the opening direction R1 beyond the intermediate inclined position.

The arm portions 51A and 51B in this example include arm upper portions 51a and 51b, respectively, having a distance corresponding to the width of the recording medium 90 as shown in FIG. 3 and FIG. 4. The arm portions 51A and 51B have arm lower portions 51c and 51d, respectively, located further outwardly than the arm upper portions 51a and 51b in the lateral direction, and a distance between arm lower portions 51c and 51d is larger than that between the arm upper portions 51a and 51b. The arm lower portions 51c and 51d are arranged in the proximity to the side walls 18 and 19 of the cabinet 11. The stoppers 13 are located on trajectories of the arm lower portions 51c and 51d.

As described above, the engaging member 50 is formed from the sheet metal. The arm portions 51A and 51B in this example are formed into plate portions substantially orthogonal to the direction along the axis of the pivot portions 21. Therefore, the arm portions 51A and 51B can be slightly deformed. In other words, the arm portions 51A and 51B can be resiliently bent slightly in the direction along the axis, while narrowing the distance therebetween. By bending the arm portions 51A and 51B in this manner, the arm portions 51A and 51B can reach the angle of the unlocked position beyond the stoppers 13.

Also, the stoppers 13 and the engaging member 50 are formed so as to allow the movement of the engaging member 50 from the unlocked position to the locked position. In this example, as shown in FIG. 11, the stoppers 13 have inclined surfaces 13a at ends thereof. The inclined surfaces 13a are inclined such that it contacts obliquely against the arm lower portions 51c and 51d when the engaging member 50 moves from the unlocked position toward the locked position. That is, the inclined surfaces 13a are inclined with respect to a plane including the trajectories of the arm portions 51A and 51B. Therefore, the arm lower portions 51c and 51d are capable of climbing over the stoppers 13 when the engaging member 50 moves from the unlocked position to the locked position. The arm lower portions 51c and 51d include bent portions 51e at edges (edges toward the cabinet 11) which come into contact against the stoppers 13 when the engaging member 50 moves from the unlocked position to the locked position. The bent portions 51e are bent inwardly of the receiving space S, whereby the arm lower portions 51c and 51d are capable of climbing over the stoppers 13 further easily.

As shown in FIG. 7, the arm portions 51A and 51B of the engaging member 50 are formed so as to come into proximity to an inner surface of the cover 20 in a state in which the proximal end portions are attached to the pivot portions 21. Also, in a state in which the cover 20 is arranged at the angle of the opening position, and the arm portions 51A and 51B are arranged along the inner surface of the cover 20, the engaging member 50 is arranged at the angle of the unlocked position. Therefore, when the cover 20 and the engaging member 50 are attached to the cabinet 11 in the manufacturing process, an operator can hold these members in a state in which the engaging member 50 is in abutment with the inner surface of the cover 20 and attached these members to the cabinet 11.

The locked range of the engaging member 50 shown in FIG. 5 and FIG. 6 is defined from the unlocked position shown in FIG. 7 in a closing direction R2 in which the cover 20 moves from the opening position to the closing position. Also, as described above, the engaging member 50 in the unlocked position can be arranged along the cover 20 at the opening position. Therefore, by pressing the engaging member 50 by the cover 20 which moves from the opening position to the closing position, the engaging member 50 can be moved from the unlocked position to the locked position. As described above, the engaging member 50 is mounted on the cover 20. Therefore, the cover 20 is attached to the cabinet 11 together with the engaging member 50 at the angle of the opening position, and then, the cover 20 is moved to the closing position, and thereby the engaging member 50 is moved from the unlocked position to the locked position. As shown in FIG. 5, the width (height) of the arm portions 51A and 51B of the engaging member 50 are designed so that the arm portions 51A and 51B come into proximity to the inner surface of the cover 20 in a state in which the cover 20 is at the closing position. Therefore, by moving the cover 20 to the closing position, the engaging member 50 can be moved reliably to the locked position.

As described above, the engaging member 50 includes the cross-bar portion 52 to be bridged between the left and right arm portions 51A and 51B. The cross-bar portion 52 is formed so as to allow the recording medium 90 to be arranged between the cover 20 and the cross-bar portion 52. Specifically, as shown in FIG. 5, the cross-bar portion 52 and the inner surface of the cover 20 have a distance therebetween which allows receiving of the recording medium 90. The height of the cross-bar portion 52 is defined so that the recording medium 90 on the cross-bar portion 52 comes to an adequate position in the receiving space S, that is, to a position allowing the readout by the electronic device 1 when the engaging member 50 is arranged at the locked position. The cover 20 includes lift portions 24 which are capable of lifting the engaging member 50 in the opening direction R1 of the cover 20 as shown in FIG. 4 and FIG. 11. When the cover 20 is moved from the closing position to the opening position, the lift portions 24 moves the engaging member 50 from the locked position to the intermediate inclined position. Accordingly, the recording medium 90 arranged between the cross-bar portion 52 and the cover 20 can be lifted by the cross-bar portion 52, so that the recording medium 90 can be taken in and out easily.

The lift portions 24 in this example project from the inner surface of the cover 20 toward the cabinet 11 as shown in FIG. 11. Then, the lift portions 24 include flange portions 24a protruding in the direction along the axis of the pivot portions 21, that is, outward in the lateral direction. As shown in FIG.

5, base portions 51*f* of the arm portions 51A and 51B are located from the flange portions 24*a* in the opening direction R1. Therefore, the flange portions 24*a* come into contact against the base portions 51*f* of the arm portions 51A and 51B in the process in which the cover 20 moves from the closing position to the opening position (see FIG. 6).

As shown in FIG. 5, the engaging member 50 is arranged at the locked position and, in a state in which the cover 20 is arranged in the closing position, the flange portions 24*a* are located apart from the base portions 51*f* of the arm portions 51A and 51B in the closing direction R2. Therefore, in a state in which the cover 20 is arranged at the opening position and the engaging member 50 is arranged at the intermediate inclined position as shown in FIG. 6, the distance between the cover 20 and the cross-bar portion 52, that is, the angle between the cover 20 and the engaging member 50 is increased in comparison with the state in which the cover 20 is located at the closing position and the engaging member 50 is located at the locked position. Consequently, the recording medium 90 can be taken in and out easily. As shown in FIG. 5, the arm lower portion 51*c* of the arm portion 51A has a depression 51*h* formed thereon which opens in the opening direction R1 and is positioned on the arm lower portion 51*c* of the arm portion 51A against which the stopper 13 comes into contact. In a state in which the engaging member 50 is arranged at the locked position shown in FIG. 5, a bottom portion of the depression 51*h* is located apart from the stopper 13. By the presence of the depression 51*h*, the engaging member 50 can be arranged at the intermediate inclined position set in the opening direction R1 from the locked position.

As shown in FIG. 9 and FIG. 11, the side wall 18 is formed with a projection 17 located in a trajectory of the flange portion 24*a*. When the cover 20 is arranged at the opening position, an end portion of the flange portion 24*a* comes into contact against the projection 17 in the closing direction R2. The cover 20 can be maintained at the opening position by the projection 17 and the flange portion 24*a*.

Figure 12A:
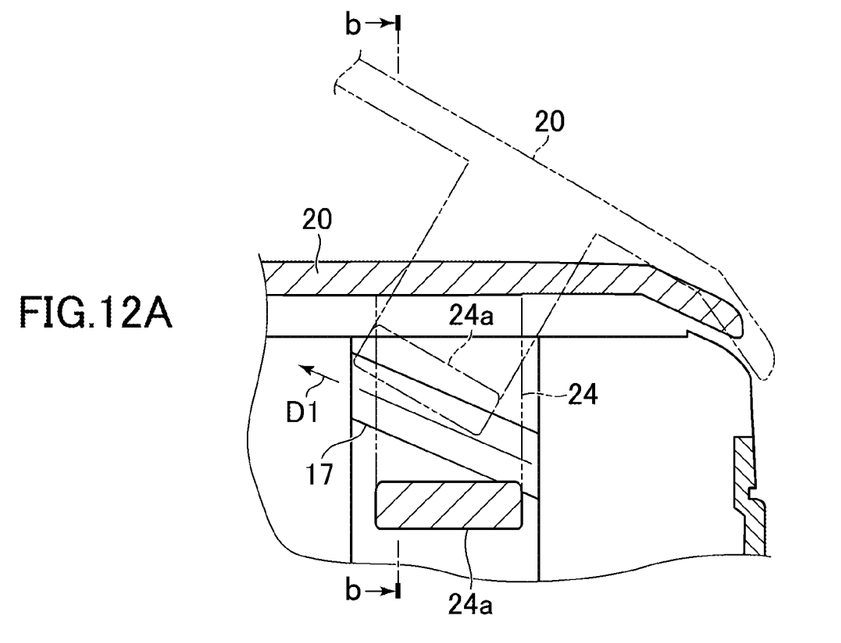
FIG. 12 is a drawing showing a positional relationship between a projection formed on a side wall of a receiving space and a flange portion formed on the cover.
Figure 12B:
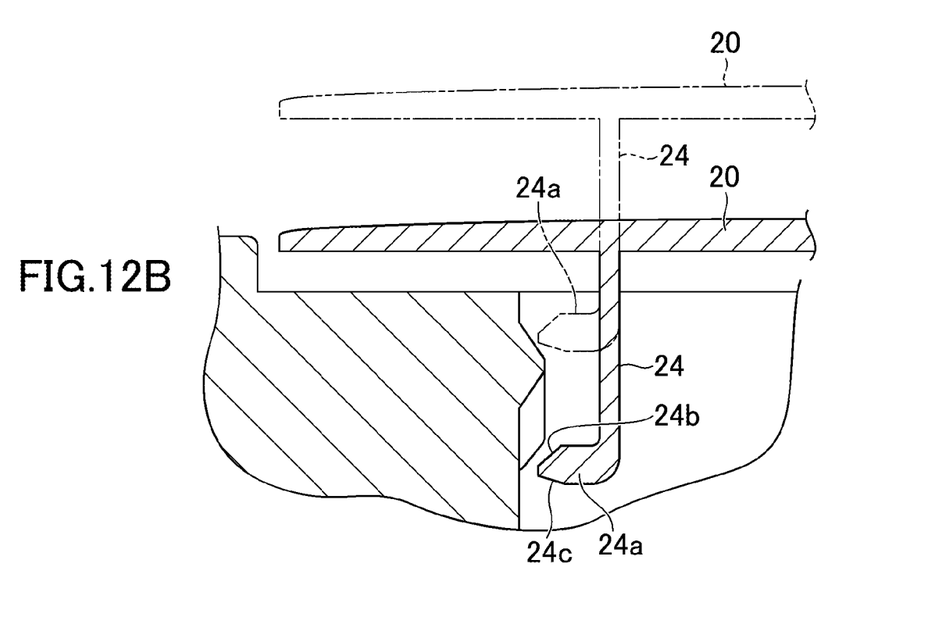

FIGS. 12A and 12B are drawings showing a positional relationship between the projection 17 and the flange portion 24*a*. In FIGS. 12A and 12B, double-dashed chain lines indicate the cover 20 at the opening position, and solid lines indicate the cover 20 at the closing position. FIG. 12B is a schematic cross-sectional view taken along a line b-b in FIG. 12A. As shown in FIG. 12A, the projection 17 is an elongated projection, and the direction of extension is inclined at an angle substantially the same as an angle of inclination of the flange portion 24*a* when the cover 20 is arranged at the opening position. As shown in FIG. 12B, the projection 17 includes a substantially triangular shape in cross section (the cross section taken along a vertical plane to the direction of extension). As described above, the projection 17 is located on the trajectory of the flange portion 24*a*. Thus the flange portion 24*a* climbs over the projection 17, and thereby the cover 20 is moved from the closing position to the opening position. When the cover 20 is arranged at the opening position, the projection 17 is located in the closing direction R2 with respect to the flange portion 24*a*. Therefore, the cover 20 is maintained at the opening position.

As shown in FIG. 12B, the flange portion 24*a* includes inclined surfaces 24*b* and 24*c* at an end portion thereof. The inclined surface 24*b* comes into contact against the projection 17 when the flange portion 24*a* moves in the opening direction R1. The inclined surface 24*c* comes into contact against the projection 17 when the flange portion 24*a* moves in the closing direction R2. An angle of the inclined surface 24*c* is larger than an angle of the inclined surface 24*b*. Therefore, the cover 20 can easily be held at the opening position in comparison with a case where the angles of the two inclined surfaces 24*b* and 24*c* are the same.

Also, as shown in FIG. 12A, the flange portion 24*a* is inclined with respect to the direction of extension of the projection 17 (the direction indicated by D1 in FIG. 12A) in a state in which the cover 20 is arranged at the opening position. In other words, an angle of the direction of extension of the projection 17 with respect to a horizontal plane is smaller than an angle of the flange portion 24*a* in a state in which the cover 20 is arranged at the opening position. Therefore, the contact position between the projection 17 and the flange portion 24*a* can be inhibited from varying due to the tolerance of the cover 20 or the cabinet 11. Although the projection 17 formed on the side wall 18 is exemplified in the description, the same projection is also formed on the side wall 19.

A method of assembling the electronic device 1 and the operation of the electronic device 1 thereafter, will be described. When assembling the electronic device 1, the arm portion 51A and the arm portion 51B of the engaging member 50 are attached to the pivot portions 21 of the cover 20. Subsequently, the cover 20 is set to the angle of the opening position with respect to the cabinet 11, and the engaging member 50 is arranged along the inner surface of the cover 20 and arranged at the angle of the unlocked position. Then, the pivot portions 21 are fitted into the depressions 12*a* of the holding portions 12 of the cabinet 11 from the rear side. Then, the cover 20 is moved in the closing direction R2. At this time, the arm portions 51A and 51B of the engaging member 50 climb over the stoppers 13 formed on cabinet 11, and move to the locked position. Consequently, the hook portions 51*g* of the engaging member 50 engages with the engaged projections 14 in the circumferential direction.

When inserting the recording medium 90 into the receiving space S, the cover 20 is moved to the opening position. At this time, the engaging member 50 is moved from the locked position to the intermediated inclined position, and the movement in the opening direction beyond the intermediate inclined position is restricted by the stoppers 13. Consequently, a distance sufficient for taking the recording medium 90 in and out can be secured between the cross-bar portion 52 of the engaging member 50 and the cover 20.

As described thus far, in the electronic device 1, the holding portions 12 of the cabinet 11 have a shape which allows the relative movement between the pivot portions 21 and the holding portions 12 in the radial direction of the pivot portions 21 such that the cover 20 is attachable to, and removable from, the device main body 10 (more specifically, the cabinet 11) in the radial direction of the pivot portions 21 of the cover 20. The engaging member 50 is movable to the locked position where the engaging member 50 engages with the cabinet 11 so as to restrict the relative movement between the pivot portions 21 and the holding portions 12. The engaging member 50 is movable to the unlocked position where the engagement between the engaging member 50 and the cabinet 11 is released. Further, the stoppers 13 restrict the movement of the engaging member 50 from the locked position to the unlocked position. According to the electronic device 1 configured as described above, since the cover 20 is attachable to, and removable from, the cabinet 11 in the radial direction of the pivot portions 21 in a state in which the engaging member 50 is arranged at the unlocked position, the workability of the operation of attaching the cover 20 to the cabinet 11 can be improved. Also, after having attached the cover 20 to the cabinet 11, the cover 20 can be prevented from separating from the cabinet 11 due to the movement of the engaging member 50 to the locked position.

In the electronic device 1, the engaging member 50 is attached to the pivot portions 21. Therefore, after having attached the engaging member 50 to the cover 20, these members can be attached to the cabinet 11, so that the workability can be further improved.

Also, in the electronic device 1, the engaging member 50 is arranged between the cover 20 and the cabinet 11, and the locked position of the engaging member 50 is set to be from the unlocked position in the closing direction R2 which is the direction in which the cover 20 is moved from the opening position to the closing position. Therefore, the engaging member 50 and the cover 20 are attached to the cabinet 11, and then, the cover 20 is moved in the closing direction, so that the engaging member 50 can be moved to the locked position.

Also, the stoppers 13 are formed on the cabinet 11 having the holding portions 12 formed thereon. Therefore, the structure of the electronic device 1 can be simplified.

Also, the engaging member 50 is attached to the cover 20. Therefore, after having attached the engaging member 50 to the cover 20, these members can be attached to the cabinet 11, so that the workability is further improved.

In addition, the engaging member 50 is movable relatively with respect to the cover 20 around the pivot portions 21. Therefore, after having attached the cover 20 and the engaging member 50 to the cabinet 11, the operation to move the engaging member 50, for example, repair of the electronic device 1 can be preformed easily.

Also, the cabinet 11 includes the engaged projections 14 projecting toward the engaging member 50 in the direction along the axis of the pivot portions 21, the engaging member 50 is formed with the hook portions 51g which engages with the engaged projections 14 in the circumferential direction of the pivot portions 21, and the engaged projections 14 come off from the hook portions 51g in the circumferential direction when the engaging member 50 is at the unlocked position. In this configuration, the engaging member 50 and the cabinet 11 can be engaged in a relatively simple structure.

Also, the engaging member 50 includes two of left and right arm portions 51A and 51B extending in the radial direction of the pivot portions 21 and the cross-bar portion 52 bridged between the two arm portions 51A and 51B. The cross-bar portion 52 is formed so as to allow the arrangement of the recording medium 90 between the cross-bar portion 52 and the cover 20. The cover 20 includes the lift portions 24 which are capable of engaging the engaging member 50 in the opening direction R1, which is the direction in which the cover 20 moves from the closing position to the opening position. In this configuration, the recording medium 90 can be taken in and out easily.

The invention is not limited to the embodiment described above, and various modifications may be made.

For example, the pivot portions 21 may be formed on the cabinet 11 and the holding portions 12 may be formed on the cover 20.

Also, the engaging member 50 may be attached to the cabinet 11 and engage with the cover 20 when arranged at the locked position.

Although the engaging member 50 is relatively rotatable with respect to the cover 20 in the description given above, the engaging member 50 may be fixed to the cover 20.

Also, the engaging member 50 is formed with the hook portions 51g and the cabinet 11 is formed with the engaged projections 14 which engages with the hook portions 51g in the description given above. However, the engaged projections may be formed to the engaging member 50 and the holding portions 12 of the cabinet 11 may be formed with a depression which functions as the hook is also applicable.

What is claimed is:

1. A portable electronic device comprising:
   a device main body;
   a receiving space formed in the device main body, for storing a recording medium therein;
   a cover for covering the receiving space, the cover being openable and closable with respect to the device main body;
   a pivot portion provided on a first member which is one of the device main body and the cover, the pivot portion supporting the cover so that the cover is openable and closable;
   a holding portion provided on a second member which the other one of the device main body and the cover, the holding portion holding the pivot portion rotatably and having a shape which allows a relative movement between the pivot portion and the holding portion in a radial direction of the pivot portion such that the first member is attachable to, and removable from, the second member in the radial direction;
   an engaging member movable around the pivot portion between a locked position and an unlocked position and attached to one of the first member and the second member so as to be separately movable from the first member and the second member, wherein the engaging member engages, at the locked position, with the other one of the first member and the second member to restrict the relative movement between the pivot portion and the holding portion, and the engaging member releases, at the unlocked position, the engagement between the engaging member and the other one of the first member and the second member; and
   a stopper for restricting the engaging member from moving from the locked position to the unlocked position,
   wherein the engaging member includes a cross bar portion being formed to allow the recording medium to be arranged between the cover and the cross bar portion, and
   wherein the cover and the engaging member are configured so that an opening direction of the cover and an opening direction of the engaging member are the same,
   wherein the cover and the engaging member are configured so that a closing direction of the cover and a closing direction of the engaging member are the same,
   wherein the cross bar portion is bridged between at least two arm portions of the engaging member extending in a direction away from the inner surface of the cover.

2. The portable electronic device according to claim 1, wherein the engaging member is attached to the pivot portion.

3. The portable electronic device according to claim 1, wherein the engaging member is arranged between the cover and the device main body, and
   the locked position of the engaging member is defined in the closing direction from the unlocked position, wherein the closing direction of the engaging member is a movement direction of the cover from the opening position to its closing position of the cover.

4. The portable electronic device according to claim 2, wherein the stopper is formed on the second member including the holding portion.

5. The portable electronic device according to claim 1, wherein the engaging member is attached to the cover.

6. The portable electronic device according to claim 5, wherein the pivot portion is formed on the cover.

7. The portable electronic device according to claim 1, wherein the other one of the first member and the second member includes an engaged projection projecting toward the engaging member in the direction along an axis of the pivot portion,
- the engaging member includes a hook which engages with the engaged projection in a circumferential direction of the pivot portion, and
- the hook is released from the engaged projection in the circumferential direction when the engaging member is at the unlocked position.

8. The portable electronic device according to claim 6, wherein the cover includes a lift portion which is capable of lifting the engaging member in the opening direction of the engaging member.

* * * * *